US007613323B2

(12) United States Patent
Nister et al.

(10) Patent No.: US 7,613,323 B2
(45) Date of Patent: Nov. 3, 2009

(54) METHOD AND APPARATUS FOR DETERMINING CAMERA POSE

(75) Inventors: David Nister, Lexington, KY (US); James Bergen, Hopewell, NJ (US)

(73) Assignee: Sarnoff Corporation, Princeton, NJ (US)

(*) Notice: Subject to any disclaimer, the term of this patent is extended or adjusted under 35 U.S.C. 154(b) by 948 days.

(21) Appl. No.: 11/159,967

(22) Filed: Jun. 22, 2005

(65) Prior Publication Data
US 2006/0013437 A1 Jan. 19, 2006

Related U.S. Application Data

(60) Provisional application No. 60/581,868, filed on Jun. 22, 2004.

(51) Int. Cl.
*G06K 9/00* (2006.01)
(52) U.S. Cl. .................. 382/103; 382/100; 382/291; 382/325; 356/138; 356/139.03
(58) Field of Classification Search .................. 382/100, 382/103, 106, 291
See application file for complete search history.

(56) References Cited

U.S. PATENT DOCUMENTS 5,259,037 A 11/1993 Plunk

| | | | |
|---|---|---|---|
| 5,475,584 A * | 12/1995 | Bani-Hashemi | 700/62 |
| 5,525,883 A * | 6/1996 | Avitzour | 318/587 |
| 5,633,995 A * | 5/1997 | McClain | 345/419 |
| 5,699,444 A * | 12/1997 | Palm | 382/106 |
| 5,974,348 A | 10/1999 | Rocks | |
| 6,724,930 B1 * | 4/2004 | Kosaka et al. | 382/154 |
| 2002/0057838 A1 | 5/2002 | Steger | |
| 2003/0004694 A1 * | 1/2003 | Aliaga et al. | 703/2 |

OTHER PUBLICATIONS

Wolfe et al. "The Perspective View of Three Points", IEEE Transactions on Pattern Analysis and Machine Intelligence, vol. 13 No. 1, Jan. 1991, pp. 66-73.*
Quan et al. "Linear N-Point Cmaera Pose Determination", IEEE Transactions on Pattern Analysis and Machine Intelligence, vol. 21 No. 8, Aug. 1999, pp. 774-780.*
Linnainmaa et al., "Pose Determination of a Three-Dimensional Object Using Triangle Pairs" IEEE Transactions on Pattern Analysis and Machine Intelligence, vol. 10 No. 5, Sep. 1988 pp. 634-647.*

* cited by examiner

*Primary Examiner*—Matthew C Bella
*Assistant Examiner*—Eric Rush
(74) *Attorney, Agent, or Firm*—Lowenstein Sandler PC (57) ABSTRACT

A method and apparatus for determining camera pose characterized by six degrees of freedom (e.g., for use in computer vision systems) is disclosed. In one embodiment an image captured by the camera is received, and at least two constraints on the potential pose are enforced in accordance with known relations of the image to the camera, such that the potential pose is constrained to two remaining degrees of freedom. At least one potential pose is then determined in accordance with the remaining two degrees of freedom.

19 Claims, 9 Drawing Sheets

METHOD AND APPARATUS FOR DETERMINING CAMERA POSE

CROSS-REFERENCE TO RELATED APPLICATIONS

This application claims benefit of U.S. provisional patent application Ser. No. 60/581,868, filed Jun. 22, 2004, which is herein incorporated by reference in its entirety.

REFERENCE TO GOVERNMENT FUNDING

The invention was made with Government support under grant number DAAD19-01-2-0012 awarded by the United States Army. The Government has certain rights in this invention.

BACKGROUND OF THE INVENTION

The utility of computer vision systems in a variety of applications is widely recognized. A fundamental task in computer vision systems is determining the pose of the image capturing device (e.g., a video camera) given one or more images of known points in the world.

An exemplary application of pose estimation is vehicle localization. By tracking environmental features from a vehicle-mounted camera, it is possible to estimate changes in vehicle position and to use this information for navigation, tracking or other purposes. However, current techniques for camera-based vehicle localization that are based on known pose estimation algorithms do not make optimal use of multiple cameras present on the vehicle, because existing methods for pose estimation assume a single-perspective camera model. As a result of this limitation, ad hoc pose estimation methods are used. For example, pose may be estimated independently for each vehicle-mounted camera and the separate pose estimates subsequently combined. Thus, such methods do not generally make the best use of available information.

By way of further example, one known method for determining the pose of a calibrated perspective camera implements the images of three known points in the world in order to constrain the possible poses of the camera to up to four pairs of solutions (where no more than one solution from each pair is valid). These solutions are typically generated in accordance with the known "three-point perspective pose problem". Though this approach can be successfully applied in many circumstances, its utility, as it stands, is limited to particular camera geometries and viewpoints. Thus, this approach is less applicable to camera models having more generalized geometries (e.g., geometries that do not adhere to a central perspective model or correspond to a single viewpoint), which have become increasingly popular tools in computer vision systems.

Therefore, there is a need in the art for a method and apparatus for determining camera pose that is substantially model-independent.

SUMMARY OF THE INVENTION

A method and apparatus for determining camera pose characterized by six degrees of freedom (e.g., for use in computer vision systems) is disclosed. In one embodiment an image captured by the camera is received, and at least two constraints on the potential pose are enforced in accordance with known relations of the image to the camera, such that the potential pose is constrained to two remaining degrees of freedom. At least one potential pose is then determined in accordance with the remaining two degrees of freedom.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention discloses a method and apparatus for determining camera pose (e.g., for computer vision systems). Unlike conventional methods for determining pose, which rely of assumptions concerning the camera model or image capture geometry, the method and apparatus of the present invention function regardless of camera model or geometry, and thus may be implemented for determining the pose of substantially any kind of camera. For example, a camera operating in conjunction with a curved mirror (e.g., a catadioptric or a dioptric system), a multi-camera rig (e.g., a stereo camera head), or any compound camera comprising a plurality of individual sensing elements rigidly attached to each other are all potential configurations that may benefit from application of the present invention. Additionally, one or more conventional cameras moving over time can be treated as a single generalized camera as long as the pose transformation relating the camera positions from one time to another is known. In each case, the only requirement imposed by the methods and devices to be described herein is that the spatial relationships among rays corresponding to image locations be known. In other words, the present invention deals with calibrated generalized cameras, including calibrated camera configurations as undistinguished special cases.

Figure 1:
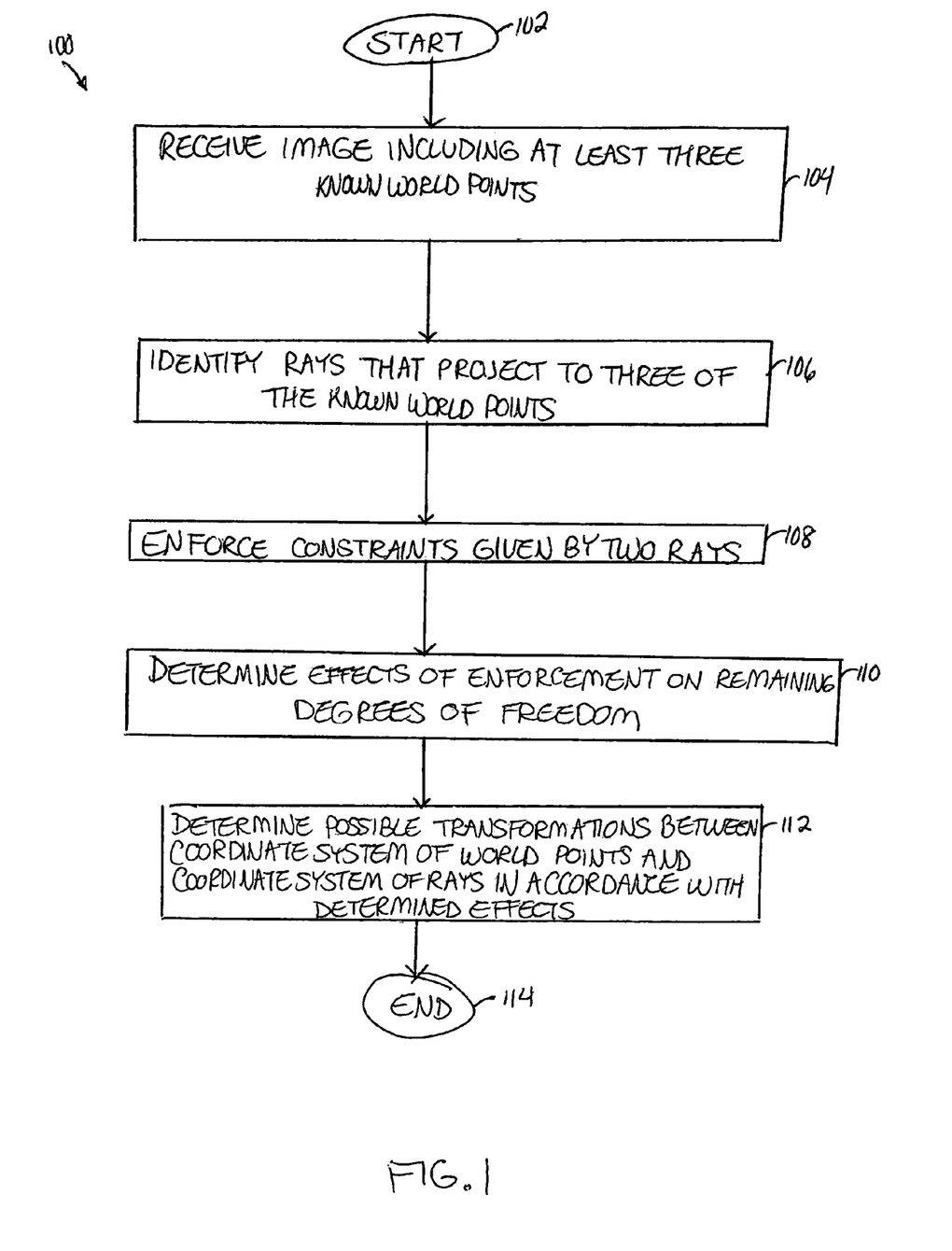
FIG. 1 is a flow diagram illustrating one embodiment of a method for determining camera pose, according to the present invention.

FIG. 1 is a flow diagram illustrating one embodiment of a method 100 for determining camera pose, according to the present invention. The method 100 may be implemented to determine the pose of substantially any camera or image capturing device. In one embodiment of the present invention, the pose that is being determined is understood to have six degrees of freedom: three degrees for rotation and three degrees for translation.

The method 100 is initialized in step 102 and proceeds to step 104, where the method 100 receives an image (e.g., an individual frame of a sequence of scene imagery) that includes at least three known world points. In one embodiment, the image is received from a generalized camera that samples a light field or plenoptic function in some arbitrary but known fashion. For example, the image may be received from at least one of: a camera operating in conjunction with a curved mirror (e.g., a catadioptric or dioptric system), a multi-camera rig or a compound camera comprising a plurality of individual sensing elements rigidly attached to each other. The world points comprise any points in the real world that are captured in the received image and whose three-dimensional position in the real world is known.

In step 106, the method 100 identifies rays of points in the coordinate system of the image capturing device that project to three of the known world points. In one embodiment, the image capturing device is calibrated such that these rays can be immediately derived.

Figure 2:
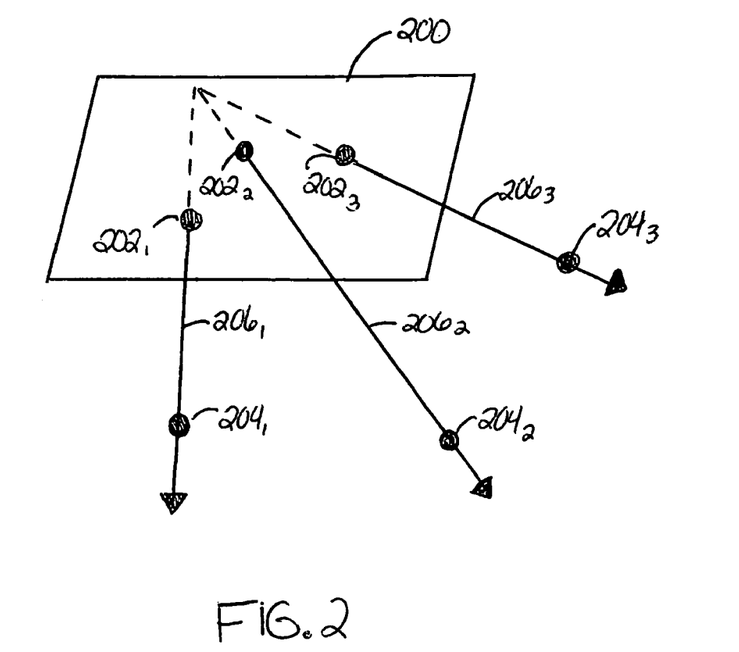
FIG. 2 is a schematic diagram illustrating an exemplary image including images of three known world points.

FIG. 2 is a schematic diagram illustrating an exemplary image 200 including images $202_1$-$202_3$ (hereinafter collectively referred to as "images 202") of three known world points $204_1$-$204_3$ (hereinafter collectively referred to as "world points 204"). As illustrated, each image 202 of a known world point 204 and the corresponding world point 204 itself lies along a common ray $206_1$-$206_3$ (hereinafter collectively referred to as "rays 206"). Generally, the pose of the image capturing device that captured the image 200 can be estimated by determining the rigid transformation of the three rays 206 such that all rays 206 meet their corresponding world points 204. One embodiment of a method for determining this rigid transformation is described in greater detail below.

Referring back to FIG. 1, once the three rays (e.g., rays 206) are identified, the method 100 proceeds to step 108 and enforces the constraints given by two of the three rays (e.g., a first ray and a second ray). Enforcement of a single ray's constraints (i.e., dictating that the ray should pass through a known world point) removes two degrees of freedom of the camera's pose. Thus, by enforcing the constraints of two rays, the pose of the image capturing device is constrained from six degrees of freedom to two degrees of freedom. The poses of the entire set of three rays with respect to the world is thus constrained to a much narrower set of possibilities.

The method 100 then proceeds to step 110 and determines the effects that the enforced constraints have on these remaining two degrees of freedom. One of these remaining two degrees of freedom can be considered in terms of a transformation of the known world point corresponding to the third ray. The second of the two remaining degrees of freedom can be considered in terms of possible positions of the third ray.

In step 112, the method 100 uses the knowledge of the remaining two degrees of freedom to determine possible transformations between the coordinate system of the world points and the coordinate system of the rays. These transformations represent potential solutions for the pose of the image capturing device. The method 100 then ends in step 114.

Figure 3:
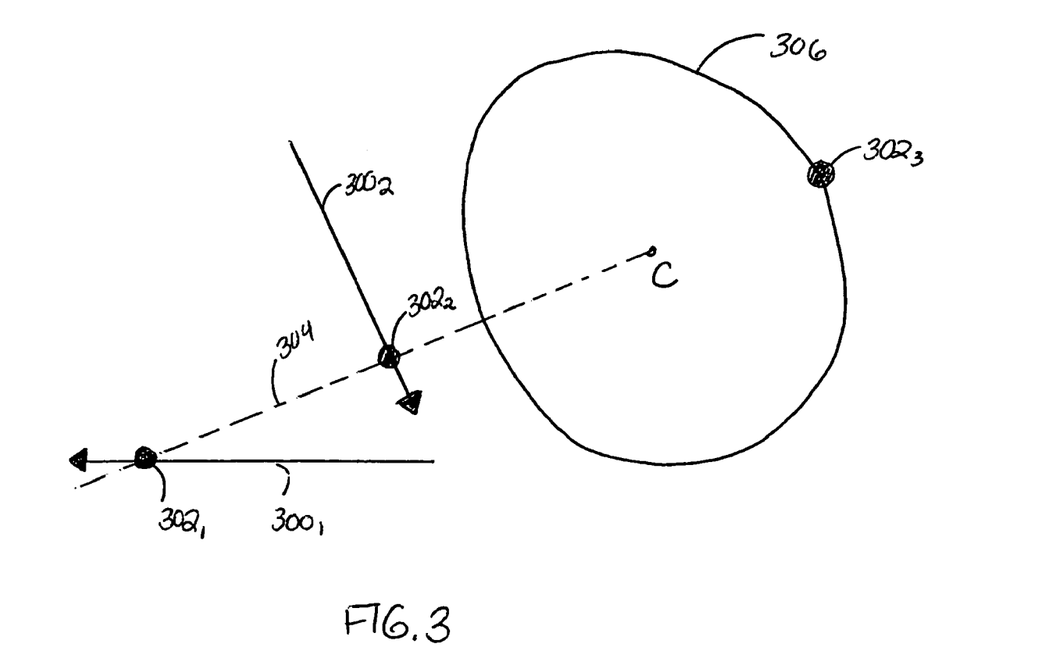
FIG. 3 is a schematic diagram illustrating an exemplary pair of rays (and the effects that enforcement of the rays' constraints has on the first of the two remaining degrees of freedom.

FIG. 3 is a schematic diagram illustrating an exemplary pair of rays (e.g., a first ray $300_1$ and a second ray $300_2$, hereinafter collectively referred to as "rays 300") and the effects that enforcement of the rays' constraints has on the first of the two remaining degrees of freedom (and hence on the potential poses of a set of three rays including the pair of rays 300). Three world points are known: a first world point $302_1$, a second world point $302_2$ and a third world point $302_3$ (hereinafter collectively referred to as "world points 302"). The first and second rays 300 meet first and second world points $302_1$, $302_3$, respectively.

The first and second world points $302_1$, $302_3$ define a unique axis 304 in space that passes through both the first world point and the second world point. The configuration of world points 302 may thus be rotated around the axis 304 without violating the constraints given by the first and second rays 300 (in effect, this illustrates the first of the remaining two degrees of freedom discussed above with respect to FIG. 1). Such a rotation enables the third world point $302_3$ to trace a circle 306 in a plane that is substantially perpendicular to the axis 304. In one embodiment, a center point C of the circle 306 lies along the axis 304. Thus, the world coordinate system may be considered as containing the first and second world points $302_1$, $302_3$ and the circle 306. The first remaining degree of freedom (discussed above) therefore enables the third world point $302_3$ to trace out a circle relative to the image capturing device.

Figure 4:
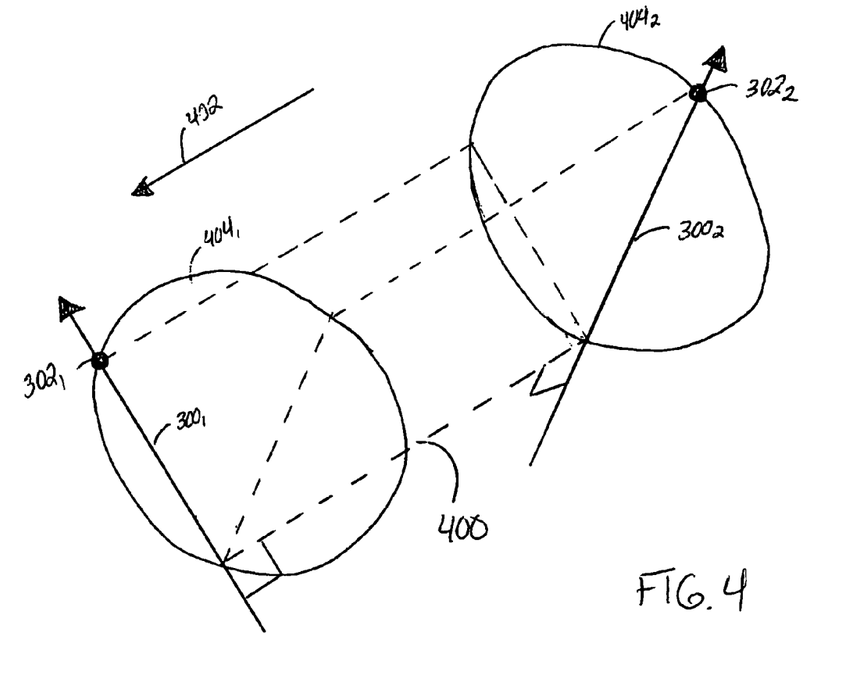
FIG. 4 is a schematic diagram further illustrating the effects that enforcement of the first and second rays' constraints has on the potential poses of a set of three rays including the pair of rays.

FIG. 4 is a schematic diagram further illustrating the effects that enforcement of the first and second rays' constraints has on the potential poses of a set of three rays including the pair of rays 300. Specifically, FIG. 4 illustrates the effect that enforcement of the constraints given by the first and second rays 300 has on the second of the remaining two degrees of freedom discussed above with respect to FIG. 1.

As illustrated in FIG. 4, it is assumed that the rays projecting from the given image are not all parallel. Thus, two rays having distinct directions may be chosen as the first and second rays 300, whose constraints are subsequently enforced. The first and second rays 300 will have a unique, common perpendicular direction and a unique perpendicular axis 400 in the common perpendicular direction that meets both rays 300.

There exists a rigid motion that revolves the perpendicular axis 400 around on a cylinder (the ends of the cylinder being defined by the circles $404_1$ and $404_2$, hereinafter referred to as "circles 400") while satisfying the constraints imposed by the first and second rays 300. In addition to the perpendicular axis 400, the cylinder defined by the circles 400 also includes the first and second world points $302_1$, $302_2$, which lie on the circumference of respective circles 400. The revolving motion of the perpendicular axis 400 affects all planes perpendicular to the perpendicular axis 400 in an equal manner. Thus, if one considers an orthographic projection along the perpendicular axis (the direction of the projection indicated by arrow 402), a cross section of the cylinder may be represented as illustrated in FIG. 5.

Figure 5:
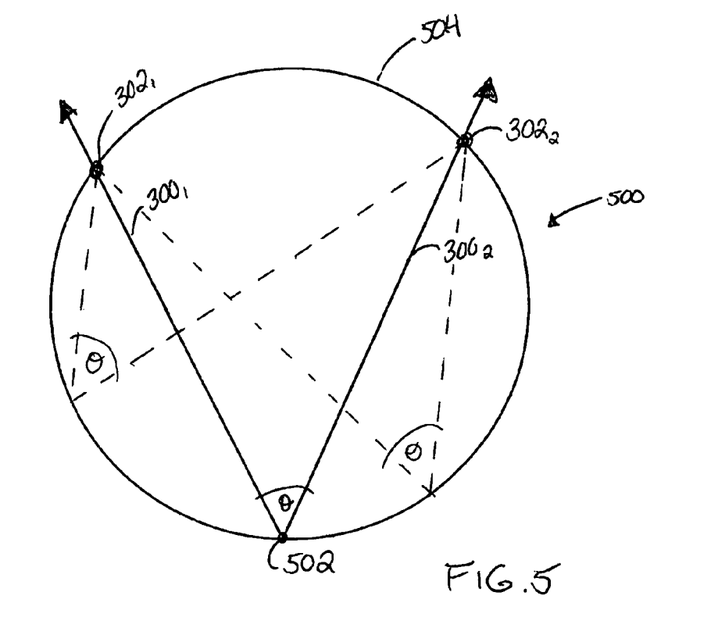
FIG. 5 is a diagram illustrating the orthographic projection along the perpendicular axis of FIG. 4.

FIG. 5 is a diagram illustrating the orthographic projection along the perpendicular axis 400 of FIG. 4 (e.g., a cross-sectional view of the cylinder 500). As illustrated, the relative positions of the first and second rays 300 define an arc 504 therebetween. An angle subtending the arc 504 and defined by the first and second rays 300 (which meet at a point 502 on the cylinder 500 through which the perpendicular axis 400 described above passes) has a size θ. It is useful to note that, as described by Book III of Euclid's *Elements*, all inscribed angles that subtend the same arc (e.g., arc 504) in a circle are equal. Thus, all angles subtending the arc 504 and inscribed in the circular cross section of the cylinder 500 will have a size of θ.

Referring back to FIG. 4, the effects of the revolving motion of the perpendicular axis 400 on the third ray (not shown) may be determined using an algebraic representation. In one embodiment, a family of transformations, each transformation mapping the known world points 302 to one of the valid positions traced out by the revolving motion of the perpendicular axis 400, is determined. Thus, the transformations map the known world points 302 into the coordinate system of the rays 300. As will be discussed in greater detail below, the world points that can map onto the third ray will lie on a ruled quartic surface that is traced by the third ray as the perpendicular axis 400 revolves.

Figure 6:
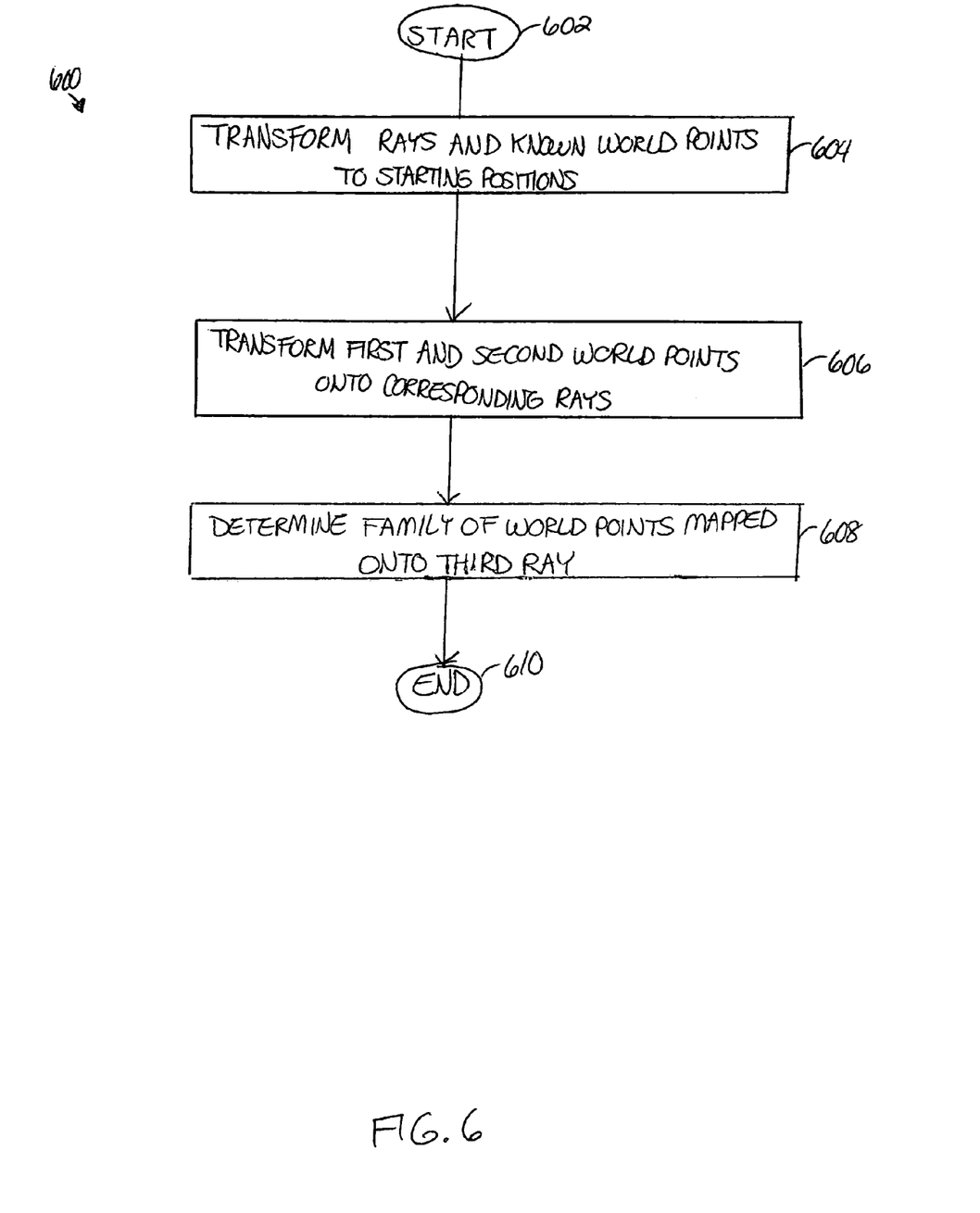
FIG. 6 is a flow diagram illustrating one embodiment of a method for mapping known world points from their own coordinate system into a coordinate system of corresponding rays.

FIG. 6 is a flow diagram illustrating one embodiment of a method 600 for mapping known world points from their own coordinate system into a coordinate system of corresponding rays. The method 600 is initialized at step 602 and proceeds to step 604, where the method 600 transforms the first and second rays 300 and the known world points 302 to starting positions that will simplify the subsequent analysis.

Figure 7A:
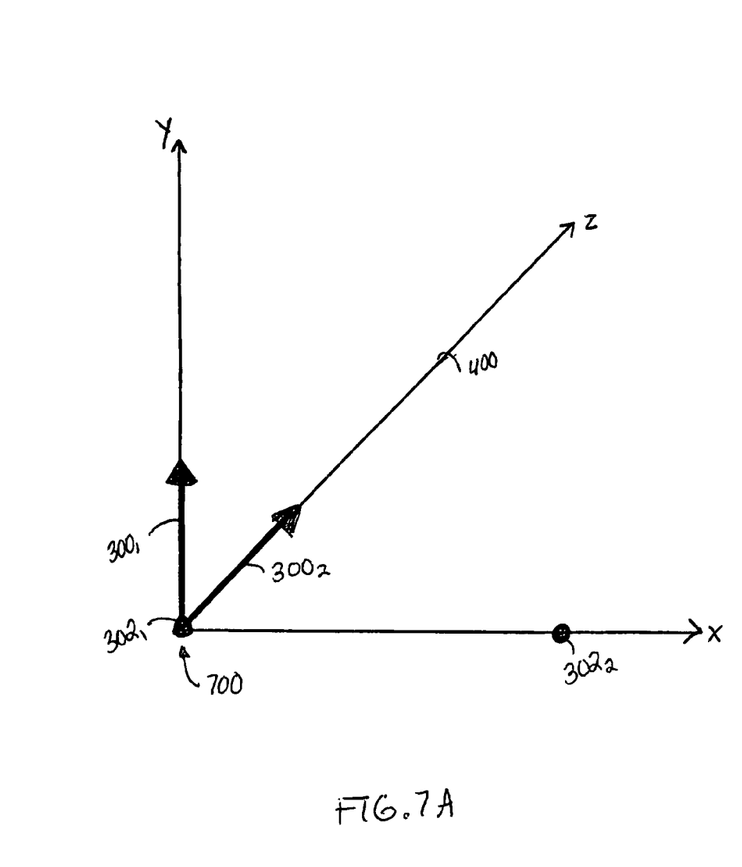
FIGS. 7A and 7B are graphs illustrating orthographic views of the transformation of the first and second rays and the known world points.
Figure 7B:
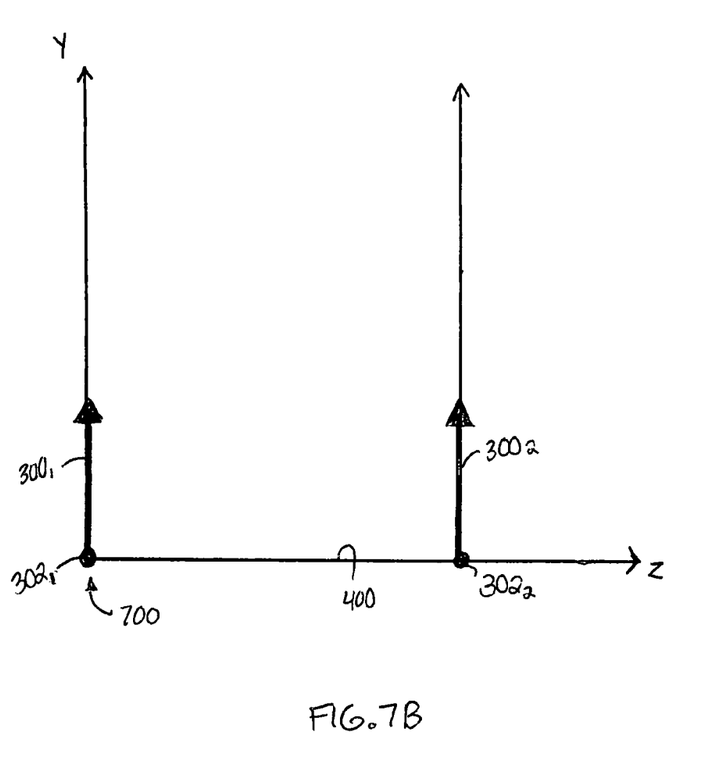

FIGS. 7A and 7B are graphs illustrating orthographic views of the transformation of the first and second rays 300 and the known world points 302. In FIGS. 7A and 7B, the first ray $300_1$ coincides with the y-axis and the perpendicular axis 400 coincides with the z-axis. Thus, the origin 700 is where the first ray $300_1$ meets the perpendicular axis 400.

The known world points 302 are then transformed such that the first and second world points $302_1$, $302_2$ are disposed at particular positions. In one embodiment, the first world point $302_1$ coincides with the origin 700. Rotation around the first world point $302_1$ results in the second world point $302_2$ lying on the line of intersection between the xz-plane and the z-plane of the second ray $300_2$. There are typically two such possible locations for the second world point $302_2$. In one embodiment, the location for the second world point $302_2$ is chosen such that x≧0. This determines the coordinate system for the world points 302 up to a rotation around the axis defined by the first and second world points $302_1$, $302_2$. In one embodiment, this rotation is chosen arbitrarily.

Referring back to FIG. 6, once the first and second rays 300 and the known world points 302 are transformed to their starting positions (e.g., as illustrated in FIGS. 7A and 7B), the method 600 proceeds to step 606 and transforms the first and second world points 302 onto their corresponding rays 300. In one embodiment, this transformation occurs in the xy-plane and applies to the world points 302 while keeping the rays 300 fixed.

Figure 8:
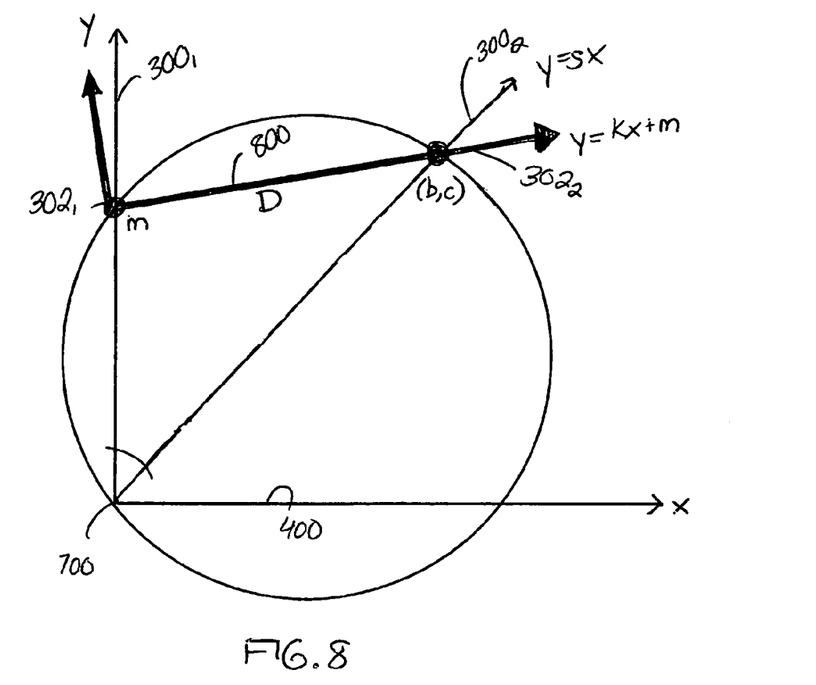
FIG. 8 is a schematic diagram illustrating one embodiment of a configuration of world points after being transformed onto their corresponding rays.

FIG. 8 is a schematic diagram illustrating one embodiment of a configuration of world points (e.g., world points 302) after being transformed onto their corresponding rays (e.g., rays 300), for example in accordance with step 606 of the method 600. The illustrated configuration is one possible configuration that results from the translation and rotation in the xy-plane to place first and second world points $302_1$, $302_2$ on first and second rays $300_1$, $300_2$, respectively. The revolving motion of the perpendicular axis (e.g., perpendicular axis 400) around the cylinder defined by circles 404 in FIG. 4 discussed above now maintains the established coincidence. In order to achieve this alignment, the projection of the second ray $300_2$ is determined to have a line equation of $$y = sx \quad \text{(EQN. 1)}$$

where s is the slope of the projection.

In one embodiment, the transformation must maintain the first world point $302_1$ on the y-axis. Thus, the position of the first world point $302_1$ is determined to be at y=m. Moreover, the projection line 800 of the axis through the first and second world points $302_1$, $302_2$ is positioned such that the line equation of the projection 800 is:

$$y = kx + m \quad \text{(EQN. 2)}$$

where k is the slop of the projection 800.

In addition, the transformation maintains the second world point $302_2$ on the second ray $300_2$. Thus, the projection of the second ray $300_2$ and the projection 800 meet at the projection, (b,c), of the second world point $302_2$, and the projection (b,c) has x-coordinate b such that $$m = (s - k)b \quad \text{(EQN. 3)}$$

As is apparent from FIG. 8, a valid transformation maps the xy-coordinates (x,y) of a world point 302 into the xy-coordinates (x',y') according to the formula:

$$\begin{bmatrix} x' \\ y' \end{bmatrix} = \begin{bmatrix} 0 \\ m \end{bmatrix} + \frac{1}{D} \begin{bmatrix} b & -(c-m) \\ c-m & b \end{bmatrix} \begin{bmatrix} x \\ y \end{bmatrix} \quad \text{(EQN. 4)}$$

where D is the projected distance between the first and second world points $302_1$, $302_2$.

EQN. 4 can be rewritten by defining a scalar, u, as:

$$u \equiv D/b \quad \text{(EQN. 5)}$$

and observing that, by Pythagoras's Theorem, one has $(k^2+1)b^2 = D^2$, which leads to:

$$u^2 = 1 + k^2 \quad \text{(EQN. 6)}$$

Thus, according to EQNs. 2, 3 and 5, the transformation of EQN. 4 can be rewritten as:

$$\begin{bmatrix} x' \\ y' \end{bmatrix} = \frac{1}{u} \left( \begin{bmatrix} 0 \\ (s-k)D \end{bmatrix} + \frac{1}{D} \begin{bmatrix} 1 & -k \\ k & 1 \end{bmatrix} \begin{bmatrix} x \\ y \end{bmatrix} \right) \quad \text{(EQN. 7)}$$

Thus, the one-dimensional family of valid transformations is parameterized by u and k under the constraint from EQN. 6.

Referring back to FIG. 6, once the first and second world points $302_1$, $302_2$ have been appropriately transformed onto the corresponding rays 300, the method 600 proceeds to step 608 and determines the family of world points mapped onto the third ray by virtue of the revolving motion of the perpendicular axis (e.g., perpendicular axis 400) around the cylinder defined by circles 404 in FIG. 4. The method 600 terminates in step 610.

In one embodiment, the family of world points mapped onto the third ray can be determined by interpreting the transformation of EQN. 7 as a full three-dimensional transformation that maps homogenous coordinates $X = [x\ y\ z\ 1]^T$ of a world point into the new homogeneous coordinates X', one gets:

$$X' = \begin{bmatrix} x - ky \\ k(x-D) + sD + y \\ uz \\ u \end{bmatrix} \quad \text{(EQN. 8)}$$

The transformed point X' lies on a plane $L=[I_1\ I_2\ I_3\ I_4]^T$ if and only if $L^T X'=0$, or:

$$a_1 + ka_2 + ua_3 = 0 \quad \text{(EQN. 9)}$$

where $$a_1 \equiv xI_1 + yI_2 + sDI_2 \quad \text{(EQN. 10)}$$

$$a_2 \equiv xI_2 - yI_1 - DI_2 \quad \text{(EQN. 11)}$$

$$a_3 \equiv zI_3 + I_4 \quad \text{(EQN. 12)}$$

The third ray can be represented by two planes L and L', and if one defines $a_1'$, $a_2'$, $a_3'$ analogously using L', one has:

$$a_1 + ka_2 + ua_3 = 0 \quad \text{(EQN. 9)}$$

$$a_1' + ka_2' + ua_3' = 0 \quad \text{(EQN. 13)}$$

Respectively eliminating k and u gives:

$$u(a_2'a_3 - a_2 a_3') = (a_2 a_1' - a_2' a_1) \quad \text{(EQN. 14)}$$

$$-k(a_2' a_3 - a_2 a_3') = (a_3 a_1' - a_3' a_1) \quad \text{(EQN. 15)}$$

Inserting EQNs. 15 and 16 into EQN. 6 gives:

$$(a_2 a_1' - a_2' a_1)^2 = (a_2' a_3 - a_2 a_3')^2 + (a_3 a_1' - a_3' a_1)^2 \quad \text{(EQN. 16)}$$

which, by the degree, is readily seen to be the definition of a quartic surface. Since the quartic surface is a union of lines, it is a ruled quartic surface.

Figure 9:
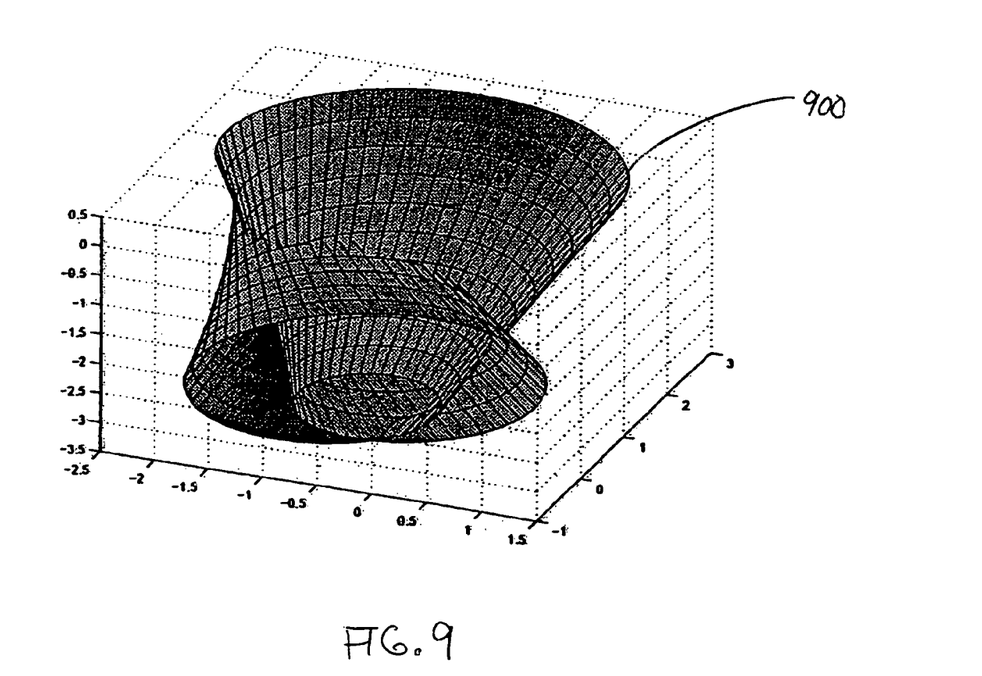
FIG. 9 is a graph illustrating an exemplary ruled quartic surface that may be traced out by the third ray due to the revolving motion associated with the second remaining degree of freedom.

FIG. 9 is a graph illustrating an exemplary ruled quartic surface 900 that may be traced out by the third ray due to the revolving motion associated with the second remaining degree of freedom. In one embodiment, all sections of the ruled quartic surface 900 that are parallel to the xy-plane are limacons, and the vertices of the limacons form a twisted cubic, part of which is a curve of self-intersection for the ruled quartic surface 900.

One can now insert the equation for the plane containing the circle (e.g., circle 306 of FIG. 3) to obtain a quartic curve in that plane. A circle has up to eight intersections with a quartic curve, and these intersections correspond to a family of world points that lies along the third ray.

Figure 11A:
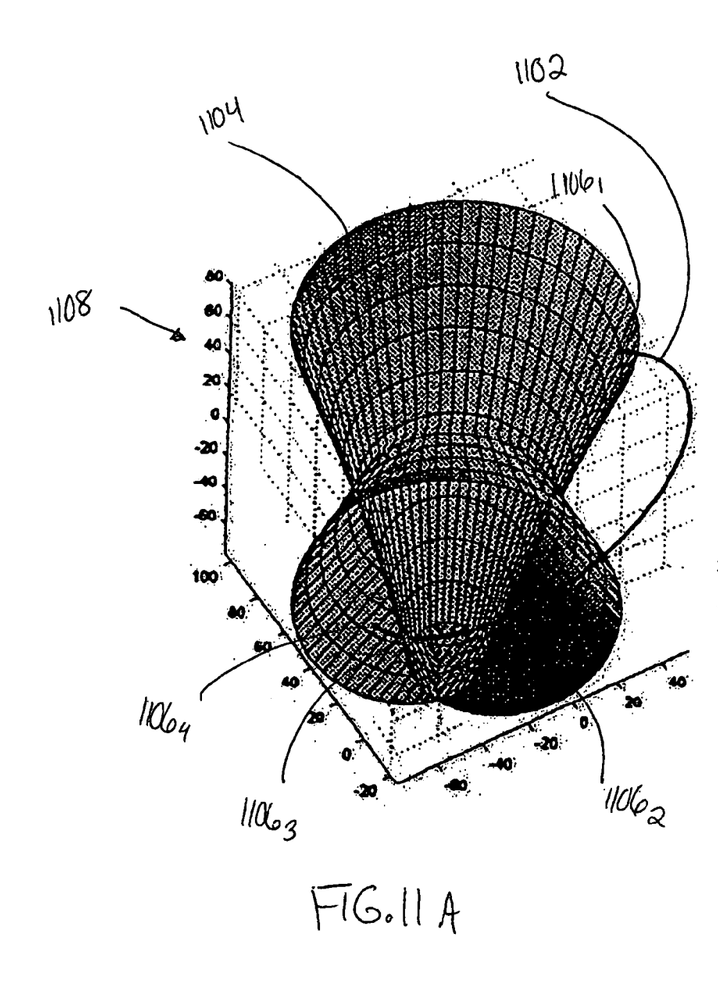
FIGS. 11A-11B are graphs illustrating the intersections of a circle and a ruled quartic surface, e.g., as obtained by enforcing the constraints of the first and second rays.
Figure 11B:
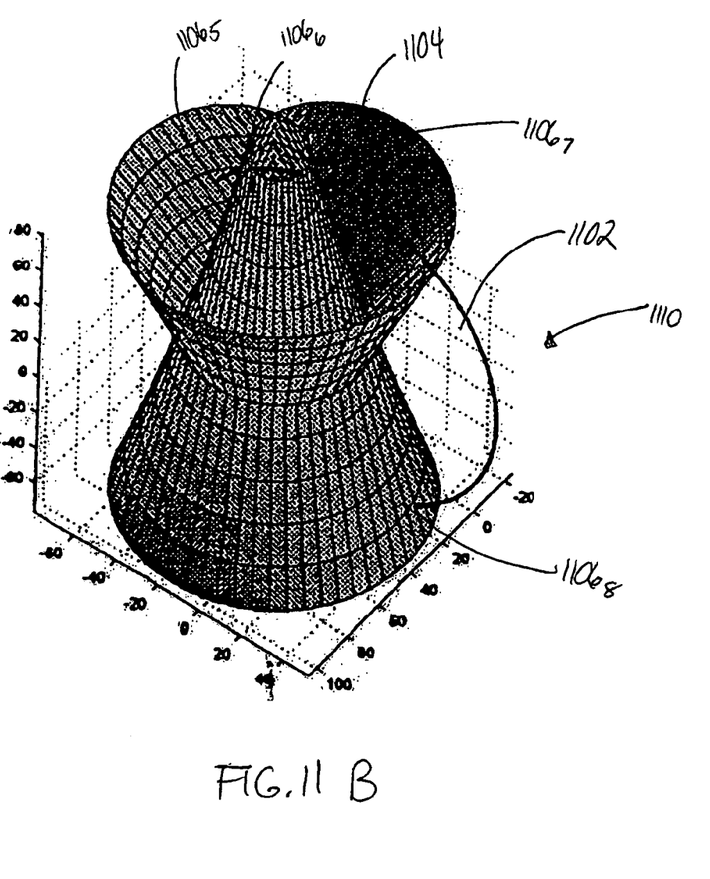

FIGS. 11A-11B are graphs illustrating the intersections of a circle 1102 (e.g., derived as discussed in accordance with FIG. 3) and a ruled quartic surface 1104 (e.g., derived as discussed in accordance with FIG. 9), e.g., as obtained by enforcing the constraints of the first and second rays as discussed above. As illustrated, a plurality of intersections 1106₁-1106₈ (hereinafter collectively referred to as "intersections 1106") exist between the circle 1102 and the ruled quartic surface 1104. Specifically, FIG. 11A shows four such intersections 1106 at the top surface 1108, and FIG. 11B shows four such intersections 1106 at the bottom surface 1110. The total of up to eight intersections 1106 between the circle 1102 and the ruled quartic surface 1104 represent up to eight possible solutions for transforming between a coordinate system of world points and a coordinate system of corresponding rays, as discussed in further detail below. Each of these transformations establishes a pose for the image capturing device with respect to the world points.

Figure 10:
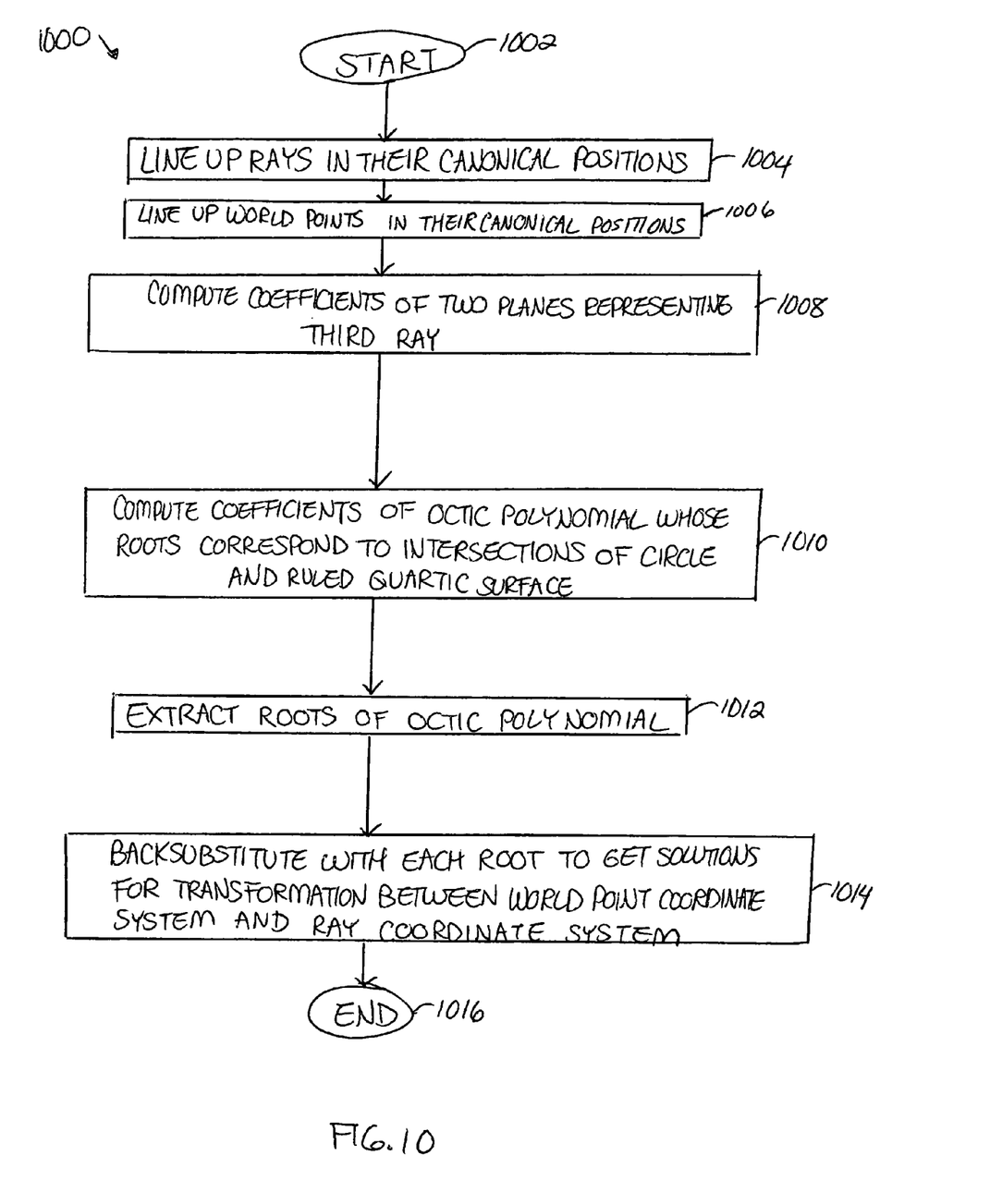
FIG. 10 is a flow diagram illustrating one embodiment of a method transforming between a coordinate system of world points and a coordinate system of corresponding rays, as discussed in further detail below.

FIG. 10 is a flow diagram illustrating one embodiment of a method 1000 transforming between a coordinate system of world points and a coordinate system of corresponding rays, as discussed in further detail below. The method 1000 is initialized at step 1002 and proceeds to step 1004, where the method 1000 lines the three rays (e.g., rays 300) up in their canonical positions.

In one embodiment, the rays are represented by the points $p_1$, $p_2$ and $p_3$ on the rays and by the unit direction vectors $d_1$, $d_2$ and $d_3$. $d_1$ is made parallel to the y-axis. The common perpendicular direction of the first and second rays is:

$$d_4 = (d_1 \times d_2)/|d_1 \times d_2| \quad \text{(EQN. 17)}$$

which is the direction to be made parallel to the z-axis.

The direction that will then become parallel to the x-axis is defined as:

$$d_5 = d_1 \times d_4 \quad \text{(EQN. 18)}$$

The conditions of EQN. 17 and EQN. 18 will be satisfied if the rays are rotated by the rotation:

$$R_1 = [d_5 d_1 d_4]^T \quad \text{(EQN. 19)}$$

The slope, s, of the second ray as defined by EQN. 1 will be:

$$s \equiv (d_1^T d_2)/(d_5^T d_2) \quad \text{(EQN. 20)}$$

Moreover, the point at which the first ray meets the perpendicular axis is placed at the origin, such that the point is given as:

$$p_4 \equiv p_1 + \alpha d_1 \quad \text{(EQN. 21)}$$

where $$\alpha \equiv (d_1 - sd_5)^T (p_2 - p_1) \quad \text{(EQN. 22)}$$

The transformation that brings the rays to their starting positions is hence:

$$H1 \equiv \begin{bmatrix} R & -R_1 p_4 \\ 0 & 1 \end{bmatrix} \quad \text{(EQN. 23)}$$

where it may be assumed that this transformation has always been applied to the rays.

In step 1006, the method 1000 lines up the world points (e.g., world points 302) up in their canonical positions. In one embodiment, the world points are given as $q_1$, $q_2$ and $q_3$. To bring the world points to their starting positions, it may first be observed that the second ray now lies entirely in the z-plane, whose z-coordinate, e, is the z-coordinate of $p_2$.

In addition, it may be observed that $$D \equiv \sqrt{|q_2 - q_1|^2 - e^2} \quad \text{(EQN. 24)}$$

Also, $$d_6 \equiv [D\ 0\ e]^T / |q_1 - q_2| \quad \text{(EQN. 25)}$$

is a unit vector in the direction from the origin toward the location where the second world point is to be positioned. Before the transformation, this direction is:

$$d_7 \equiv (q_1 - q_2)/|q_1 - q_2| \quad \text{(EQN. 26)}$$

Also defined is:

$$d_8 \equiv [0\ 1\ 0]^T \quad \text{(EQN. 27)}$$

and $$d_9 \equiv (d_7 \times (q_3 - q_1))/|d_7 \times (q_3 - q_1)| \quad \text{(EQN. 28)}$$

where $d_b$ and $d_9$ are unit vectors perpendicular to $d_6$ and $d_7$, respectively. Thus, the desired rotation becomes:

$$R_2 \equiv [d_6 d_8(d_6 \times d_8)][d_7 d_9(d_7 \times d_9)]^T \quad \text{(EQN. 29)}$$

and the transformation applied to the points becomes:

$$H_2 \equiv \begin{bmatrix} R & -R_2 q_1 \\ 0 & 1 \end{bmatrix} \quad \text{(EQN. 30)}$$

where in one embodiment, it is assumed that the transformation $H_2$ has already been applied to the points.

In step 1008, the method 1000 computes the coefficients L and L' of the two plane equations representing the third ray. In one embodiment, the coefficient L and L' are computed by finding two distinct normal vectors n and n' that are perpendicular to $d_3$. In one embodiment, n is chosen as the vector of largest magnitude out of the two vector products $d_3 \times [1\ 0\ 0]^T$ and $d_3 \times [0\ 1\ 0]^T$. n' is then chosen such that $n' \equiv d_3 \times n$, and the plane vectors are:

$$L \equiv [n^T - n^T p_3]^T \quad \text{(EQN. 31)}$$

and $$L' \equiv [n'^T - n'^T p_3]^T \quad \text{(EQN. 32)}$$

The method 1000 then proceeds to step 1010 and computes the coefficients of the octic polynomial whose roots correspond to the intersections of a circle and a ruled quartic surface. In one embodiment, the octic polynomial, in z, is derived by eliminating x and y from the quartic expression of EQN. 16. After the world points have been lined up in accordance with step 1006, the circle sits in a plane defined by:

$$[x\ y\ z]d_6 = q_3^T d_6 \quad \text{(EQN. 33)}$$

which gives $$x = K_1 \quad \text{(EQN. 34)}$$

where $$K_1 = -\frac{e}{D} z + \frac{|q_2 - q_1| q_3^T d_6}{D} \quad \text{(EQN. 35)}$$

Moreover, the circle is the intersection between the plane and the sphere $$x^2 + y^2 + z^2 = |q_3|^2 \quad \text{(EQN. 36)}$$

If one inserts EQN. 34 into EQN. 36, ones gets:

$$y^2 = K_2 \quad \text{(EQN. 37)}$$

where $$K_2 = |q_3|^2 - z^2 - K_1^2 \quad \text{(EQN. 38)}$$

By subsequently inserting EQN. 34 into EQN. EQNs. 10 and 11, one gets:

$$a_1 = y K_3 + K_4 \quad \text{(EQN. 39)}$$

$$a_2 = y K_5 + K_6 \quad \text{(EQN. 40)}$$

$$a_3 = K_7 \quad \text{(EQN. 41)}$$

$$a'_1 = y K_8 + K_9 \quad \text{(EQN. 42)}$$

$$a'_2 = y K_{10} + K_{11} \quad \text{(EQN. 43)}$$

$$a'_3 = K_{12} \quad \text{(EQN. 44)}$$

where $$K_3 \equiv I_2 \quad \text{(EQN. 45)}$$

$$K_4 \equiv I_1 K_1 + sDI_2 \quad \text{(EQN. 46)}$$

$$K_5 \equiv -I_1 \quad \text{(EQN. 47)}$$

$$K_6 \equiv I_2 K_1 - DI_2 \quad \text{(EQN. 48)}$$

$$K_7 \equiv zI_3 + I_4 \quad \text{(EQN. 49)}$$

$$K_8 \equiv I'_2 \quad \text{(EQN. 50)}$$

$$K_9 \equiv I'_1 K_1 + sDI'_2 \quad \text{(EQN. 51)}$$

$$K_{10} \equiv -I'_1 \quad \text{(EQN. 52)}$$

$$K_{11} \equiv I'_2 K_1 - DI'_2 \quad \text{(EQN. 53)}$$

$$K_{12} \equiv zI'_3 + I'_4 \quad \text{(EQN. 54)}$$

Applying EQNs. 39 through 44 and EQN. 38, the expressions of EQN. 17 may be expanded as:

$$a_2 a'_1 - a'_2 a_1 = K_{13} y + K_{14} \quad \text{(EQN. 55)}$$

$$a'_2 a_3 - a_2 a'_3 = K_{15} y + K_{16} \quad \text{(EQN. 56)}$$

$$a_3 a'_1 - a'_3 a_1 = K_{17} y + K_{18} \quad \text{(EQN. 57)}$$

where $$K_{13} = K_5 K_9 + K_6 K_8 - K_3 K_{11} - K_4 K_{10} \quad \text{(EQN. 58)}$$

$$K_{14} = K_6 K_9 - K_4 K_{11} + K_2(K_5 K_8 - K_3 K_{10}) \quad \text{(EQN. 59)}$$

$$K_{15} = K_7 K_{10} - K_5 K_{12} \quad \text{(EQN. 60)}$$

$$K_{16} = K_7 K_{11} - K_6 K_{12} \quad \text{(EQN. 61)}$$

$$K_{17} = K_7 K_8 - K_3 K_{12} \quad \text{(EQN. 62)}$$

$$K_{18} = K_7 K_9 - K_4 K_{12} \quad \text{(EQN. 63)}$$

Squaring the right hand sides of EQNs. 55-57, inserting into EQN. 16 and again applying EQN. 38 yields:

$$K_{19} = K_{20} y \quad \text{(EQN. 64)}$$

where $$K_{19} = K_2(K_{13}^2 - K_{15}^2 - K_{17}^2) + K_{14}^2 - K_{16}^2 - K_{18}^2 \quad \text{(EQN. 65)}$$

$$K_{20} = 2(K_{15} K_{16} + K_{17} K_{18} - K_{13} K_{14}) \quad \text{(EQN. 66)}$$

By squaring EQN. 64 and again applying EQN. 38, one gets:

$$K_{21} = 0 \quad \text{(EQN. 67)}$$

where $$K_{21} = K_{19}^2 - K_2 K_{20}^2 \quad \text{(EQN. 68)}$$

which is an octic polynomial in z whose roots correspond to the up to eight solutions.

Once the octic polynomial is established in step 1010, the method 1000 proceeds to step 1012 and extracts the roots of the octic polynomial. In one embodiment, the roots are extracted by eigen-decomposing a companion matrix.

In one embodiment, the octic polynomial is first normalized so that it may be written as:

$$z^8+\beta_7 z^7+\beta_6 z^6+\ldots+\beta_0 \quad \text{(EQN. 69)}$$

The roots are then found as the eigenvalues of the 8×8 companion matrix:

$$\begin{bmatrix} [-\beta_7 & -\beta_6 & \ldots & -\beta_0] \\ 1 & & & \\ & \ddots & & \\ & & 1 & \end{bmatrix} \quad \text{(EQN. 70)}$$

In an alternative embodiment, the roots of the octic polynomial may be found using Sturm sequences, e.g., as discussed by D. Nister in *An Efficient Solution to the Five-Point Relative Pose Problem*, IEEE Conference on Computer Vision and Pattern Recognition, Volume 2, pp. 195-202, 2003.

Once the roots of the octic polynomial are extracted, the method 1000 proceeds to step 1014 and backsubstitutes with each root of the octic polynomial to get solutions for the transformation between the world point coordinate system and the ray coordinate system. In one embodiment, this is accomplished by computing, for each solution for z, x by EQN. 34 and y by EQN. 64. u and k can then be computed using EQNs. 14 and 15, respectively. The transformation defined in EQN. 7 is then uniquely determined and labeled as $H_3$. For each solution, the transformation $H_4$, which rotates the third world point $q_3$ around to the correct point on the circle, is also found.

In one embodiment, $d_{10}$ is defined such that:

$$d_{10} \equiv (d_6 \times [x\, y\, z]^T)/|d_6 \times [x\, y\, z]^T| \quad \text{(EQN. 71)}$$

The desired rotation is then:

$$R_4 \equiv [d_6 d_{10}(d_6 \times d_{10})][d_6 d_8(d_6 \times d_8)]^T \quad \text{(EQN. 72)}$$

and the transformation applied to the world points is:

$$H4 \equiv \begin{bmatrix} R_4 & 0 \\ 0 & 1 \end{bmatrix} \quad \text{(EQN. 73)}$$

The full transformation from the coordinate system of the world points to the coordinate system of the rays is then:

$$H = H_1^{-1} H_3 H_4 H_2 \quad \text{(EQN. 74)}$$

The transformation embodied in EQN. 74 is determined for each root of the octic polynomial such that up to eight transformations are obtained. These eight transformations represent potential solutions for transforming from the coordinate system of the world points to the coordinate system of the rays. Thus, the potential solutions may be treated as hypotheses for testing within a hypothesize-and-test architecture that determines the pose of the image capturing device.

The method 1000 then terminates in step 1016.

Figure 12:
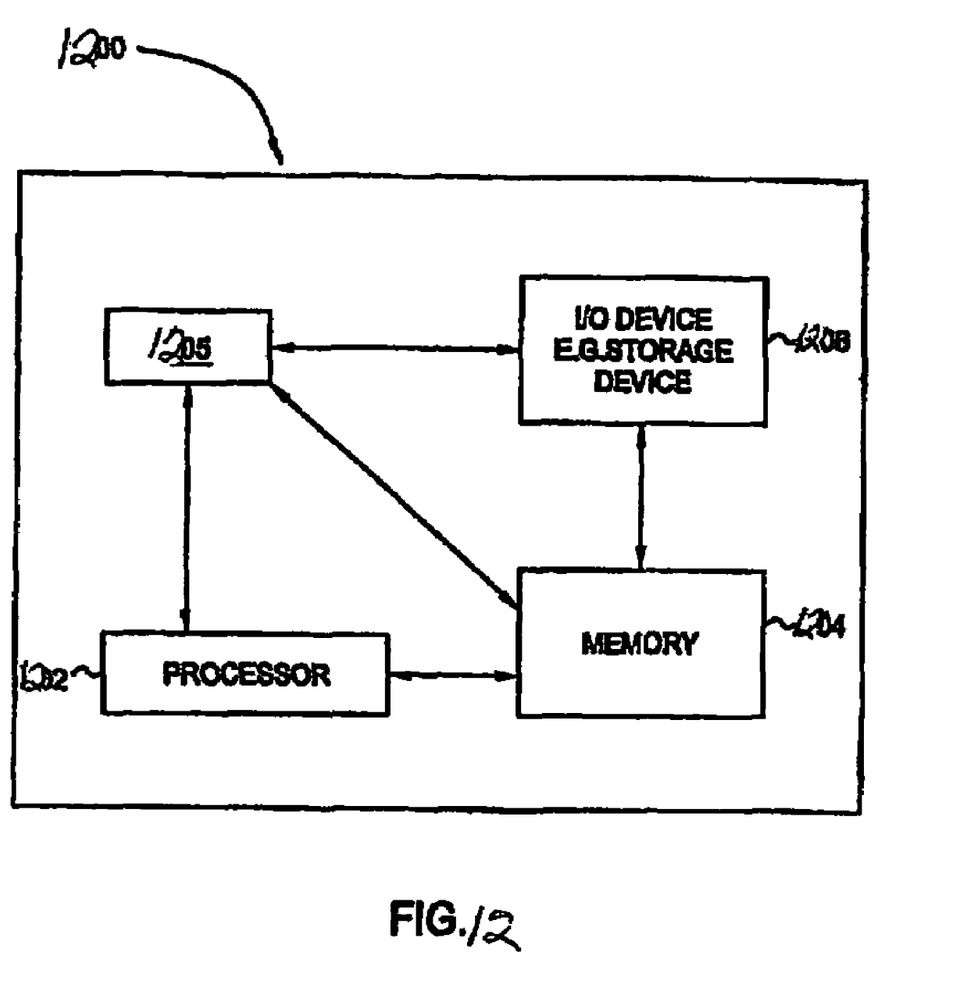
FIG. 12 is a high level block diagram of the camera pose estimation method that is implemented using a general purpose computing device.

FIG. 12 is a high level block diagram of the camera pose estimation method that is implemented using a general purpose computing device 1200. In one embodiment, a general purpose computing device 1200 comprises a processor 1202, a memory 1204, a camera pose estimation module 1205 and various input/output (I/O) devices 1206 such as a display, a keyboard, a mouse, a modem, and the like. In one embodiment, at least one I/O device is a storage device (e.g., a disk drive, an optical disk drive, a floppy disk drive). It should be understood that the camera pose estimation module 1205 can be implemented as a physical device or subsystem that is coupled to a processor through a communication channel.

Alternatively, the camera pose estimation module 1205 can be represented by one or more software applications (or even a combination of software and hardware, e.g., using Application Specific Integrated Circuits (ASIC)), where the software is loaded from a storage medium (e.g., I/O devices 1206) and operated by the processor 1202 in the memory 1204 of the general purpose computing device 1200. Thus, in one embodiment, the camera pose estimation module 1205 for determining the pose of a camera or other image capturing device described herein with reference to the preceding Figures can be stored on a computer readable medium or carrier (e.g., RAM, magnetic or optical drive or diskette, and the like).

Thus, the present invention represents a significant advancement in the field of computer vision systems. A method and apparatus are provided that enable the pose of an image capturing device to be hypothesized based on a limited amount information known about the image capturing device and an image captured by the image capturing device. The method and apparatus function independently of the model or geometry of the image capturing device, and thus may be implemented for determining the pose of substantially any kind of image capturing device.

While the foregoing is directed to embodiments of the present invention, other and further embodiments of the invention may be devised without departing from the basic scope thereof, and the scope thereof is determined by the claims that follow.

The invention claimed is:

1. A computer implemented method for determining at least one potential pose of an image capturing device, said at least one potential pose having six degrees of freedom, the method comprising:

using a processor to perform the steps of:

receiving an image captured by said image capturing device, said image including images of at least: a first know world point, a second known world point and a third known world point; and imposing constraints on said at least one potential pose in accordance with known relations of said image to said image capturing device, said imposing comprising:

enforcing constraints given by a first ray, a second ray and a third ray, where said first ray, said second ray and said third ray each project from said image capturing device to, respectively, said first known world point, said second known world point and said third known world point, wherein said enforcing constraints given by said first ray and said second ray constrains said at least one potential pose to two remaining degrees of freedom; and wherein a first of said two remaining degrees of freedom constrains a position of said third known world point relative to said image capturing device within an area defined by a circle and a second of said two remaining degrees of freedom constrains a position of said third ray relative to said image capturing device within an area defined by a ruled quartic surface, said circle and said ruled quartic surface having a plurality of intersection points; and determining said at least one potential pose in accordance with said constraints, wherein said determining comprises the steps of:
- lining up said first ray, said second ray, and said third ray in their canonical positions;
- lining up said first known world point, said second known world point, and said third known world point in their canonical positions;
- computing coefficients of two plane equations representing said third ray;
- computing coefficients of an octic polynomial whose roots correspond to said plurality of intersection points of said circle with said ruled quartic surface;
- extracting the roots of said octic polynomial; and
- backsubstituting with each root of the octic polynomial to get solutions for the transformation between the coordinate system of said first known world point, said second known world point and said third known world point and the coordinate system of said first ray, said second ray and said third ray.

2. The method of claim 1, wherein said remaining two degrees of freedom comprise:
- a first degree of freedom represent a transformation of said third known world point; and
- a second degree of freedom representing at least one possible position of a third ray projecting from said image capturing device to said third known world point.

3. The method of claim 1, wherein each of said plurality of intersection points identifies one of said at least one potential pose of said image capturing device with respect to said first known world point, said second known world point and said third known world point.

4. The method of claim 3, therein each of said plurality of intersection points is determined by said extracting the roots of said octic polynomial.

5. The method of claim 1, wherein said image capturing device conforms to a non-central projection image formation model.

6. The method of claim 5, wherein said image capturing device comprises at least one of: a multi camera rig, a catadioptric camera, a dioptric camera or a multi-lens camera.

7. The method of claim 5, wherein said image capturing device is a stereo camera head.

8. The method of claim 5, wherein sad image capturing device comprises a plurality of cameras positioned at different locations, relative orientations of said plurality of cameras being known.

9. The method of claim 5, wherein said image capturing device comprises a camera mounted to a vehicle for capturing a plurality of images as said vehicle moves.

10. A computer-readable memory having stored thereon a plurality of instructions, the plurality of instructions including instructions which, when executed by a processor, cause the processor to perform the steps of a method for determining at least one potential pose of an image capturing device, said at least one potential pose having six degrees of freedom, the method comprising:
- receiving an image captured by said image capturing device, said in age including images of at least: a first known world point, a second known world point and a third known work point; and
- enforcing constraints on said at least one potential pose in accordance with known relations of said image to said image capturing device, said enforcing comprising;
- enforcing constraints given by a first ray, a second ray and a third ray, where said first ray, said second ray and said third ray each project from said image capturing device to, respectively, said first known world point, said second known world point and said third known world point, wherein said enforcing constraints given by said first ray and said second ray constrains said at least one potential pose to two remaining degrees of freedom; and
- wherein a first of said two remaining degrees of freedom constrains a position of said third known world point relative to said image capturing device within an area defined by a circle and a second of said two remaining degrees of freedom constrains a position of said third ray relative to said image capturing device within an area defined by a ruled quartic surface, said circle and said ruled quartic surface having a plurality of intersection points; and determining at least one potential pose in accordance with said constraints, wherein said determining comprises the steps of;
- lining up said first ray, said second ray, and said third ray in their canonical positions;
- lining up said first known world point, said second known world point, and said third known world point in their canonical positions;
- computing coefficients of two plane equations resenting said third ray;
- computing coefficients of an octic polynomial whose roots correspond to said plurality of intersection points of said circle with said ruled quartic surface;
- extracting the roots of said octic polynomial; and
- backsubstituting with each root of the octic polynomial to get solutions for the transformation between the coordinate system of said first known world point, said second known world point and said third known world point and the coordinate system of said first ray, said second ray and said third ray.

11. The computer-readable memory of claim 10, wherein said remaining two degrees of freedom comprise:
- a first degree of freedom representing a transformation of said third known world point; and
- a second degree of freedom representing at least one possible position of a third ray projecting from said image capturing device to said third known world point.

12. The computer-readable memory of claim 10, wherein each of said plurality of intersection points identities one of said at least one potential pose of said image capturing device with respect to said first known world point, said second known world point and said third known world point.

13. The computer-readable memory of claim 12, wherein each of said plurality of intersection points is determined extracting die roots of said octic polynomial.

14. The computer-readable memory of claim 10, wherein said image capturing device conforms to a non-central projection image formation model.

15. The computer-readable memory of claim 14, wherein said image capturing device comprises at least one of: a multi-camera rig, a catadioptric camera, a dioptric camera or a multi-lens camera.

16. The computer-readable memory of claim 15, wherein said image capturing device is a stereo camera head.

17. The computer-readable memory of claim 14, wherein said image capturing device comprises a plurality of cameras positioned at different locations, relative orientations of said plurality of cameras as being known.

18. The computer-readable memory of claim 14, wherein said image capturing device comprises a camera mounted to a vehicle for capturing a plurality of images as said vehicle moves.

19. An apparatus for determining at least one potential pose of an image capturing device, said potential pose having six degrees of freedom, the apparatus comprising:

means for receiving an image captured by said image capturing device, said image including images of at least: a first known world point, a second known world point and a third known world point; and means for enforcing constraints on said at least one potential pose in accordance with known relations of said image to said image capturing device. said means for enforcing comprising:

means for enforcing constraints given by a first ray, a second ray an a third ray, where said first ray, said second ray and said third ray each project from said image capturing, device to, respectively, said first known world point, said second known world point and said third known world point, wherein said means for enforcing constraints given said first ray and said second ray constrains said at least one potential pose to two remaining degrees of freedom; and wherein a first of said two remaining degrees of freedom constrains a position of said third known world point relative to said image capturing device within an area defined by a circle and a second of said two remaining degrees of freedom constrains a position of said third ray relative to said image capturing device within an area define by a ruled quartic surface, said circle and said ruled quartic surface having a plurality of intersection points; and means for determining at least one potential pose in accordance with said constraints wherein said means for determining comprises:

means for lining up said first ray said second ray and said third ray in their canonical positions:

means for lining up said first known world point, said second known world point, and said third known world point in their canonical positions;

means tor computing coefficients of two plane equations representing said third ray;

means for computing coefficients of an octic polynomial whose roots correspond to said plurality of intersection points of said circle with said ruled quartic surface;

means for extracting the roots of said octic polynomial; and means for backsubstituting with each root of the octic polynomial to get solutions for the transformation between the coordinate system of said fist known world point, said second known world point and said third known world point and the coordinate system of said first ray, said second ray and said third ray.

* * * * *